J. JELINEK.
MOWER.
APPLICATION FILED OCT. 4, 1916.

1,264,079.

Patented Apr. 23, 1918.
3 SHEETS—SHEET 1.

Witnesses
B. S. Gramm
L. N. Gillis

Inventor
J. Jelinek
By Chandler & Chandler.
Attorneys

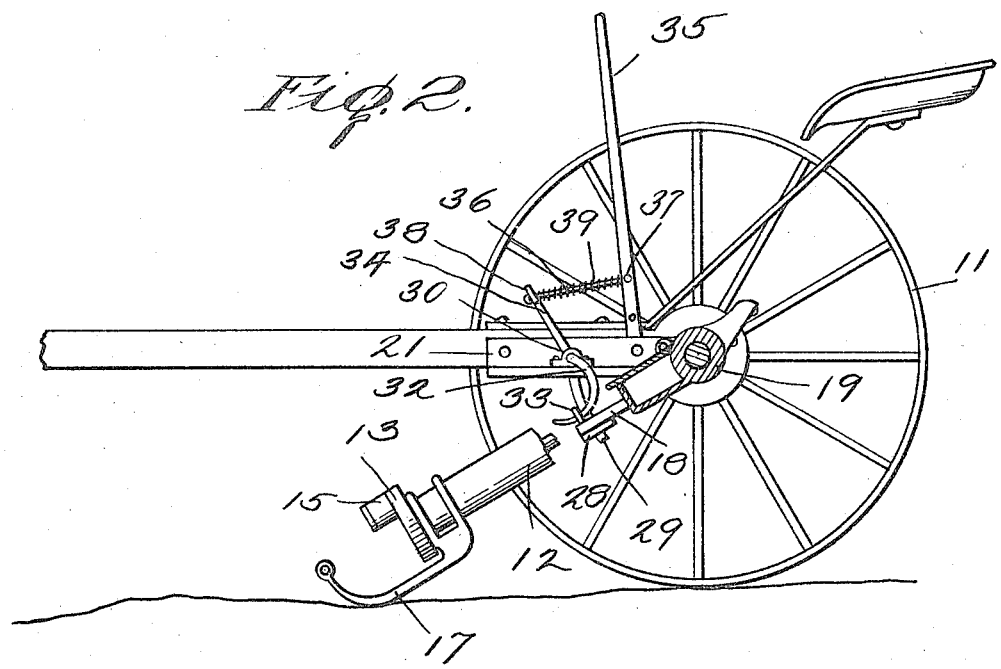
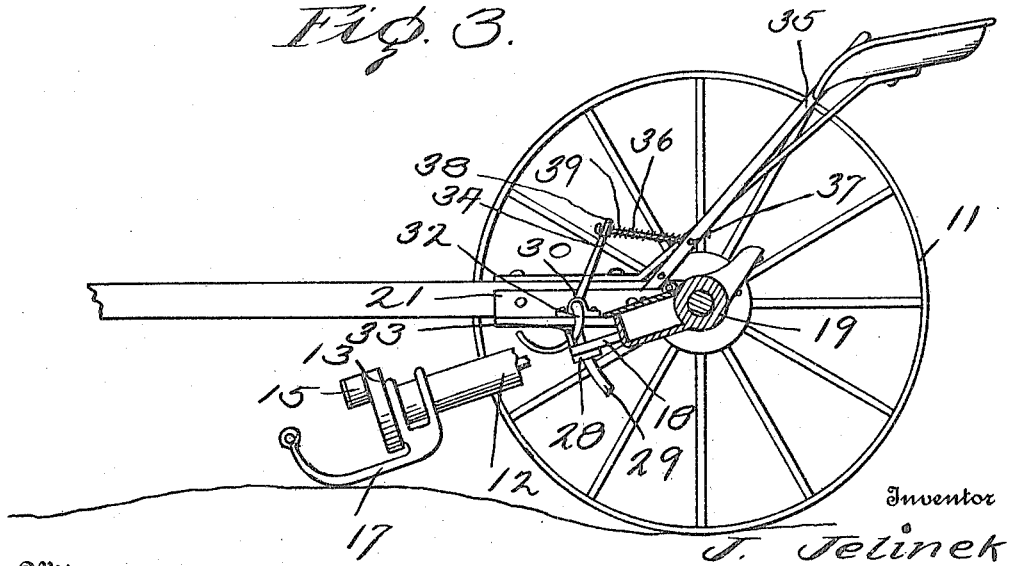

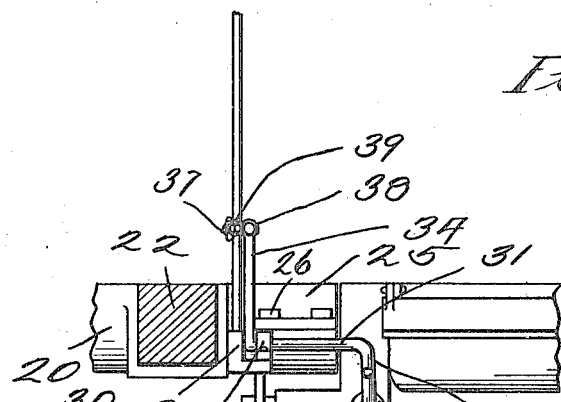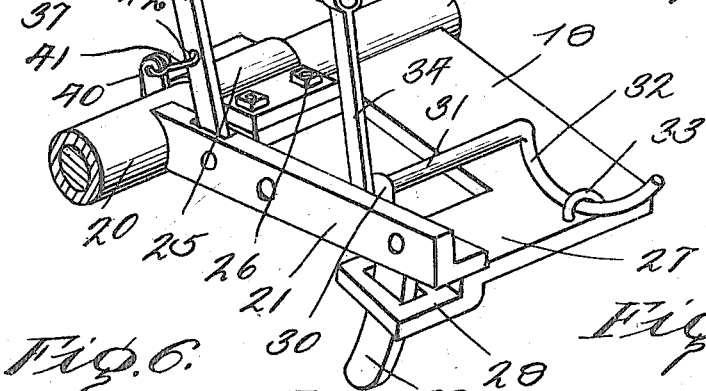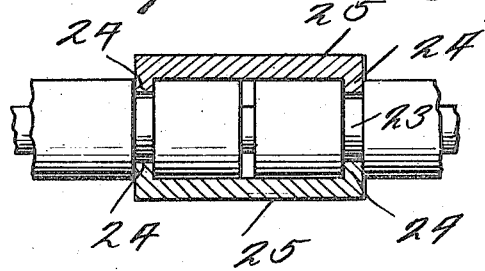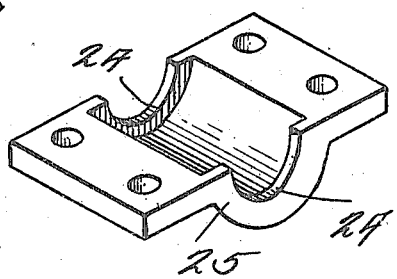

UNITED STATES PATENT OFFICE.

JOHN JELINEK, OF PLAINVILLE, KANSAS.

MOWER.

1,264,079.   Specification of Letters Patent.   Patented Apr. 23, 1918.

Application filed October 4, 1916.   Serial No. 123,711.

*To all whom it may concern:*

Be it known that I, JOHN JELINEK, a citizen of the United States, residing at Plainville, in the county of Rooks, State of Kansas, have invented certain new and useful Improvements in Mowers; and I do hereby declare the following to be a full, clear, and exact description of the invention, such as will enable others skilled in the art to which it appertains to make and use the same.

This invention relates to mowers, and has special reference to a horse drawn mower of the type employing a reciprocating knife.

In mowers of this type difficulty is experienced on account of the fact that the housing which carries the main part of the driving mechanism moves up and down with the variation in the position of the tongue of the machine so that the connecting rod which connects the crank disk at the housing with the sickle bar varies in its angular relation to the sickle bar and is practically at no time in alinement therewith. This causes lateral stresses which tend to increase the wear of the sickle bar and also to increase the friction of the device.

The principal object of the present invention is to so improve the construction of mowers as to obtain a practically straight line drive between the crank disk and the sickle bar of the machine.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Fig. 3 is a view similar to Fig. 2 but showing the device in the position assumed when the sickle bar is passing over an elevation in the ground.

Fig. 4 is a detail section on the line 4—4 of Fig. 1.

Fig. 5 is a detail perspective view of a portion of the improved arrangement of sleeves and their connected parts.

Fig. 6 is a detail section through the two sleeves and their connecting bearings.

Fig. 7 is a detail perspective view of the interior of one of the bearings.

Fig. 8 is a detail perspective view of one of the sleeves, showing the end adjacent to the other sleeve.

Figure 1:
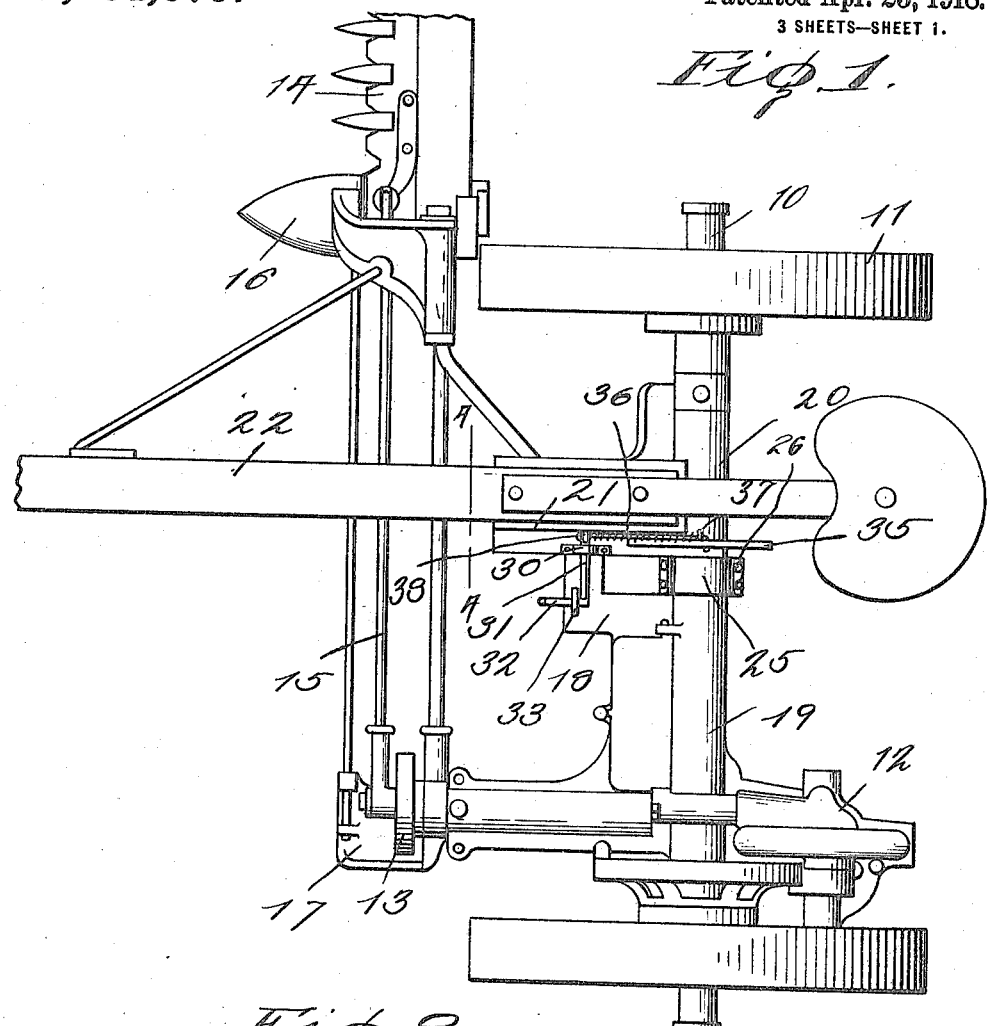
Figure 1 is a plan view of a portion of a mower constructed in accordance with this invention.
Figure 2:
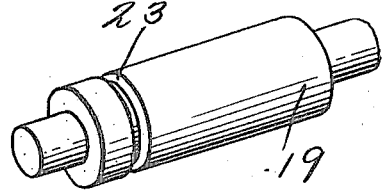
Fig. 2 is a section on the line 2—2 showing the parts in the position occupied when the sickle bar is passing across a depression in the ground.

The invention is here shown as applied to an ordinary mower having an axle 10 supported on wheels 11, the mower being provided with the usual housing 12 for the gearing and shafting of the sickle operating mechanism. The shaft which extends through this housing 12 carries on its lower and forward end the crank disk 13 which is connected to the knife bar 14 by means of a pitman or connecting rod 15. The sickle and adjacent parts are supported in the usual manner by a shoe 16 at their inner ends so that the inner end at all times rests on the ground and in the present instance there is provided on the forward end of the housing 12 a shoe 17. This housing 12 is either formed integrally with or connected to the forwardly extending portion 18 of a sleeve 19 which is rotatably mounted on the axle 10. There is also rotatably mounted on this axle 10 a sleeve 20, the two sleeves 19 and 20 being independently rotatable and the latter sleeve being provided with a forwardly extending arm 21 adapted for connection to the tongue 22 of the mower.

These sleeves are provided adjacent their inner ends with circumferential grooves 23 wherein fit ribs 24 carried by the bearing or coupling halves 25, the two halves being held together in the usual manner by bolts and nuts 26.

On the forwardly extending portion 18 is a lateral portion 27 carrying at the end nearest the arm 21 an eye 28 which is slidably engaged on an arc bar 29 having its upper end formed integrally with the arm 21 and depending therefrom concentric to the axis of the sleeve 20. Thus the portion 18 can move up and down at its forward end independently of the portion 21. In order to effect this movement positively and to raise the forward end when desired, there is provided on the arm 21 a bearing 30 wherethrough passes a rock shaft 31 carrying on one end an arcuate arm 32 which extends through a loop 33 carried by the portion 18.

The arcuate arm 32 is so arranged and positioned that it acts as a cam with respect to the loop 33 and portion 18, the effect being that rotation of the shaft 31 in one direction depresses the forward end of the portion 18 while rotation in the opposite direction raises said forward portion. On the rock shaft 31 is also fixed a rock arm 34 which is connected to an adjusting lever 35 by means of a bolt 36, the bolt being pivoted to the lever 35 as at 37 and being slidable through an eye 38 at the end of the rock arm 34. In order to hold the lever 35 and arm 34 in their relative positions yieldably the bolt 36 is surrounded by a coil spring 39 which bears at one end against the lever 35 while at the other end it bears against the arm 34. This lever 35 is pivoted to the arm 21 and by moving the lever rearwardly the member 18 is positively raised while if the lever is moved forwardly the member 18 will drop until the shoe 17 rests upon the ground whereupon any forward movement of the mower over rough ground will be permitted because the spring 39 will yield when the forward end of the housing is raised so that the inequalities of the ground are fully taken care of, being understood that the shoe 16 will also pass over these inequalities. By this means the crank disk 13 is always kept substantially in alinement with the sickle bar so that the stresses on the pitman or connecting bar 15 are straight line stresses. In order to hold the forward end of the housing raised the sleeve 20 is provided with an eye 40 to which is connected a hook 41 which is engageable in an opening 42 in the lever 35 when the lever is in its rearward position.

From the foregoing it will be seen that the movement of the housing is independent of the movement or position of the tongue so that no matter what the inequalities of the ground they are properly taken care of.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

In a mowing machine, the combination with a wheeled axle, of a sleeve engaged with the axle, a tongue support carried by the sleeve and extending forwardly therefrom, a second sleeve loosely mounted upon the axle for rotation thereupon independently of the first sleeve, cutting mechanism connected with the second sleeve for movement vertically when said second sleeve is rotated upon the axle, a forwardly projecting extension carried by the second sleeve and having a laterally turned forward end extending beneath the tongue supporting member and provided with an eye, a member pendent from the tongue supporting member and engaged through the eye, a rock shaft pivoted upon the tongue supporting member in parallel relation to the axle, a loop carried by the forward extension of the second sleeve, an acuate arm carried by the rock shaft and slidably engaged through the loop for movement of the loop and therewith the extension of the second sleeve vertically when the rock shaft is rocked, and manually operable means for rocking the shaft.

In testimony whereof, I affix my signature, in the presence of two witnesses.

JOHN JELINEK.

Witnesses:
 BERT B. McREYNOLDS,
 FRANCES KRING.

Copies of this patent may be obtained for five cents each, by addressing the "Commissioner of Patents, Washington, D. C."